Sept. 15, 1970     D. C. GRANT, JR     3,528,746
OPTICAL MODULATOR
Filed Jan. 5, 1966     2 Sheets-Sheet 1
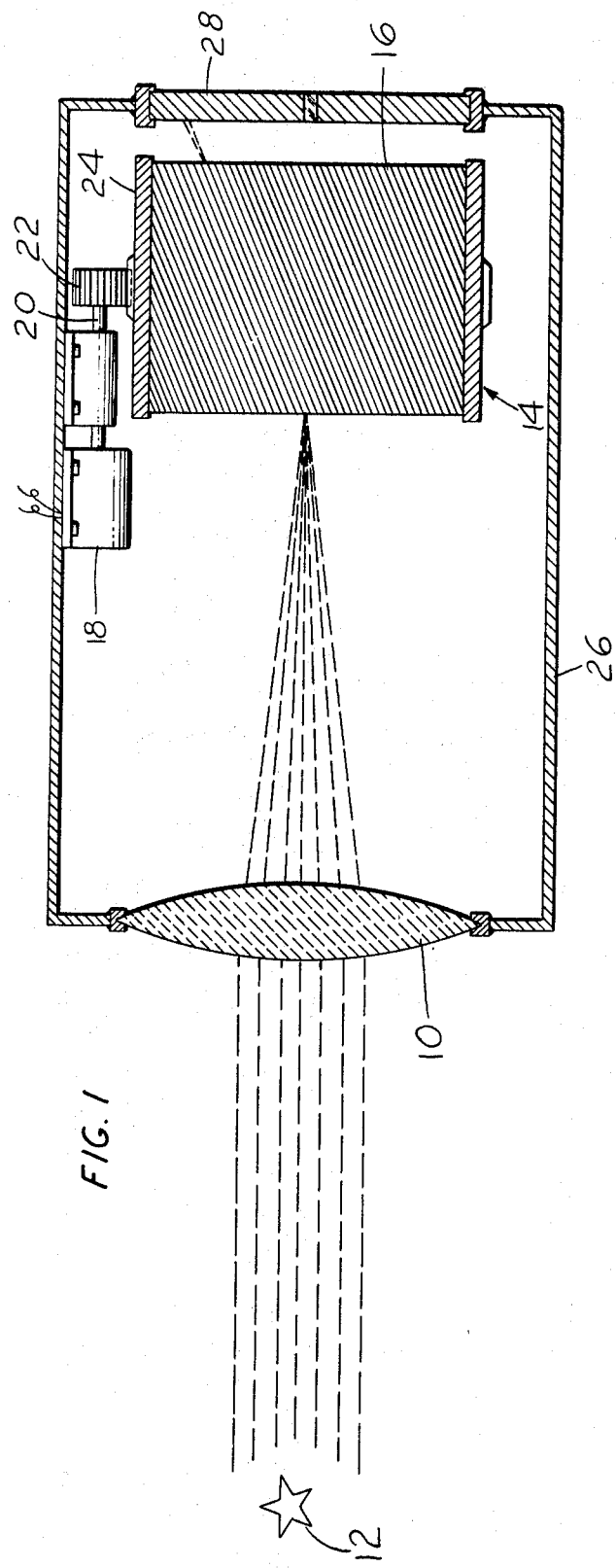
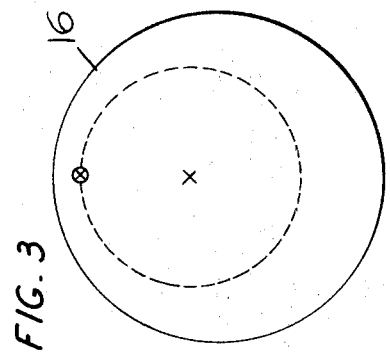
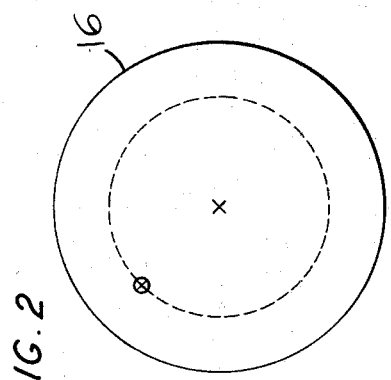
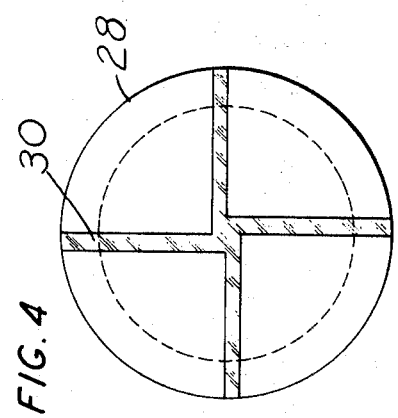
INVENTOR
DAVID C. GRANT JR.
BY Fishman & Van Kirk
ATTORNEYS 3,528,746
OPTICAL MODULATOR
David C. Grant, Jr., Simsbury, Conn., assignor to United Aircraft Corporation, East Hartford, Conn., a corporation of Delaware
Filed Jan. 5, 1966, Ser. No. 518,954
Int. Cl. G01b *11/26;* G01c *1/00;* G01j *1/20*
U.S. Cl. 356—152         12 Claims This invention relates to optical modulation. More particularly, this invention is directed to causing an image of a remotely located object to scan a plane perpendicular to the optical axis of the image focusing means. Accordingly, the general objects of this invention are to provide new and improved methods and apparatus of such character.

While not limited thereto in its utility, the present invention is particularly suited for incorporation within a stellar guidance system. Accordingly, this invention will be described herein in association with a star angle sensor such as would be found in a stellar guidance system. For a more detailed description of a prior art star angle sensor, reference may be had to U.S. patent application Ser. No. 135,339, filed Aug. 31, 1961 by John Victor Hughes, now Pat. No. 3,242,795 and assigned to the same assignee as this invention. As is well known in the art, a star angle sensor and its associated electronics enable determination of the angle between the line of sight to a selected star and the direction in which the optical axis of the star angle sensor is pointed. Thus, in terms of a guidance system, the star angle is the angle the line of sight to the star makes with the pitch, roll and yaw axes of the craft on which the sensor is mounted.

The basic component of a star angle sensor is a telescope to view the star. If, as in the usual case, space is at a premium, the telescope may comprise a folded catadioptric system of the Maksutov-Cassegrain type. Such a telescope is shown in FIG. 1 of above-mentioned Pat. No. 3,242,795. The telescope will, of course, bring the image of the star to focus in a focal plane. Located in this focal plane will be a reticle having a plurality of light transparent portions properly oriented with respect to one another. By positioning a photoelectric device and its associated electronics behind the reticle and causing the image focused by the telescope to scan the front face of the reticle, information regarding the magnitude and direction of the star may be obtained. That is, the magnitude and time displacement of the light pulses provided by the scanning of the image of the star across the transparent portions of the reticle produces, in the manner well known in the art and fully described in above-mentioned copending application Ser. No. 135,339, electrical signals whose magnitude and time displacement are commensurate with the magnitude and star angle of a star within the field of vision of the telescope.

It is in the manner in which the image of the object, in this case a star, is rotated or caused to scan the face of the reticle to which this invention is directed. In the prior art, a wedge or prism was positioned in front of the objective lens of the telescope. The wedge was rotated by suitable means. As is well known, light incident on a wedge is caused to deviate in one plane. Thus, as the wedge rotated, the plane of deviation rotated. Consequently, the angle of incidence of light, emanating from the remotely located source (star), on the wedge varied with rotation of the wedge. Light passing through the wedge was focused by the lens at the reticle and, because of the rotation of the wedge, the star image scanned (transcribed a circle on) the reticle.

The disadvantages of prior art optical modulators of the type described above, while not affecting their utility, are significant. For example, since the rotating wedge was positioned in front of the objective lens, it was necessary that it be slightly larger than the lens. This, of course, added to the weight and size of the apparatus. More importantly, the positioning of the wedge in front of the lens dictated that the telescope employed have a focal length of at least 12 inches. That is, in the prior art systems it was necessary to position the apertured reticle in the focal plane of the objective lens. The radius of the image circle transcribed on the reticle by the modulated image was determined by the focal length of the lens multiplied by the tangent of the deviation angle of the wedge. Restated, in prior art optical modulators of the type being described, the radius of the image circle and thus the physical size of the reticle was a function of the focal length of the lens. The smallest practical reticle that could be fabricated (i.e., the smallest possible image circle) dictated a focal length of at least 12 inches.

Another disadvantage precipitated by positioning of the modulator (wedge) in front of the lens was that this location, in the case of employment on a space craft, required that the means for causing wedge rotation be operated in a vacuum environment. The driving means was typically an electric motor. As is well known, lubrication problems dictate that optimum performance and life of a motor cannot be achieved by operation in a vacuum. Also, since vacuum operation eliminates the possibility of using air bearings, the power requirements for such operation are higher than for operation in a gaseous atmosphere. It should be further noted that these power requirements are increased still further by the size of the wedge which, since it had to be larger in diameter than the lens, had a relatively large moment arm.

The only manner in which vacuum operation of the modulator (wedge) driving means could be avoided in the prior art was to place a window in front of the rotating wedge and then encapsulate the entire modulator-telescope assembly within a pressurized container. The window, however, would cause undesirable attenuation of the incoming light as well as adding to the size and weight of the assembly.

It should especially be noted that prior art rotating wedge type optical modulators were not applicable to auto-collimation techniques for determining the angular position of remotely located reflecting surfaces or for visual sighting of the object being observed. The foregoing was a result of the modulating wedge being disposed between the objective lens and the object.

This invention overcomes the foregoing disadvantages of prior art optical modulators by providing new and improved methods of and apparatus for scanning an image.

It is therefore an object of this invention to modulate an optical image.

It is also an object of this invention to provide a more compact optical modulator than previously available.

It is another object of this invention to provide an optical modulator applicable to auto-collimation techniques.

It is a further object of this invention to provide an optical modulator capable of operating in a gaseous environment and having lighter weight than previously available devices of such character.

It is another object of this invention to provide an optical modulator requiring less power for operation than those previously available.

It is still another object of this invention to provide an optical modulator in which the radius of the image circle is independent of the focal length of the image focusing means.

It is yet another object of this invention to provide an optical modulator which permits simultaneous visual observation of the object being looked at.

It is still another object of this invention to provide an optical modulator in which the means for driving a rotating modulator element may be located within a gaseous environment.

These and other objects of this invention are accomplished by employing a fiber optic plate, positioned behind and in the focal plane of the objective lens, as the modulating means. The individual fibers comprising the plate are substantially parallel and are tilted with respect to the optical axis of the lens. Scanning of the image is accomplished by rotating the fiber optic plate and, since the plate is behind the lens, the lens can simultaneously be used for visual observation or auto-collimation.

This invention may be better understood and its many advantages will become apparent to those skilled in the art by reference to the accompanying drawing wherein like reference numerals refer to like elements in the various figures and in which:

FIG. 1 is a cross-sectional view of an optical modulator designed in accordance with this invention.

FIG. 2 depicts a rear view of the modulating element of the apparatus of FIG. 1 as it would appear when the line of sight to the object being observed coincides with the optical axis of the assembly.

FIG. 3 depicts a rear view of the modulating element of the apparatus of FIG. 1 as it would appear when the line of sight to the object being observed does not coincide with the optical axis of the system.

FIG. 4 is a front view of the reticle of the apparatus of FIG. 1.

FIG. 5 is a cross-sectional view of an optical modulator designed in accordance with this invention and including means for auto-collimation and simultaneous visual observation of the object being sighted on.

Figure 5:
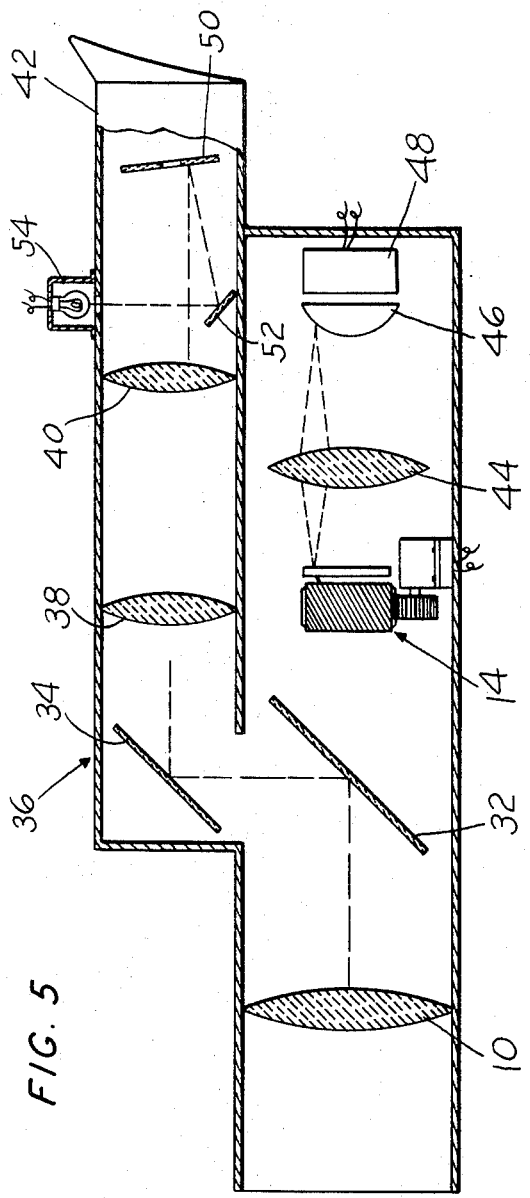

Referring now to FIG. 1, an objective lens 10 focuses the image of a star 12 at the front face of a modulator assembly indicated generally at 14. It should be noted that, while but a single objective lens 10 (a simple refracting telescope) has been shown, the folded catadioptric system of FIG. 1 of the above mentioned copending application Ser. No. 135,339, less its modulating wedge 16, could be utilized to focus the image of star 12 at the face of modulator 14.

Modulator 14 comprises a fiber optic plate 16 and means for causing said plate to rotate about the optical axis of the telescope or lens 10. For the purposes of simplicity, the means for causing this rotation has been shown as a motor 18 which, through shaft 20 and gear 22, drives plate 16 through engagement of a gear formed on the cylindrical mounting means 24 for the fiber optic plate. It is to be understood that the aforementioned gearing arrangement has been depicted in the interests of facilitating understanding of this invention and that other driving schemes may be desirable. For example, a hollow shaft motor, with plate 16 affixed directly to the rotor, may be employed as the driving means and the plate may rotate on an air bearing.

Motor 18, the driving means and fiber optic plate 16 are all located within a sealed container 26 and mounted so that they will be retained in the proper position relative to lens 10 and each other. Container 26 is filled with a suitable gas, such as air or nitrogen, which will provide the lubricity needed for an air bearing. Container 26 preferably has lens 10 mounted in such a manner as to function as the entrance window therefor. A reticle 28, which will be described in more detail below, is sealed into the side of container 26 opposite to lens 10 (i.e., behind modulator 14) and thus functions as an exit window for light passing through container 26. Considering the embodiment as shown in FIG. 1, the photo detectors and associated electronics which complete the star angle sensor will be located to the right of reticle 28.

Plate 16 comprises bundles of optical fibers held together by suitable binder material. Such fiber optic plates are commercially available. The optical fiber bundles, sometimes called light pipes, which comprise plate 16 consist of light conducting elements or fibers thereof which are tightly packed in side by side, substantially parallel relation to each other. These light conducting elements or fibers typically comprise an inner core of high index flint glass or the like having disposed thereon a relatively thin outer coating or cladding of low index crown glass or tthe like. Typically, the high index glass is formed in the shape of a rod, the low index glass or other suitable coating disposed thereon and the rod then drawn out to the desired fiber size. The outer coating may serve the dual functions of preventing leakage of light from one filament to the next while sometimes also serving as a binding material during the formation of a group or bundle of filaments. For a more detailed treatment of the subject of fiber optics, reference may be had to the paper entitled "Fiber Optics: Principles, Properties and Design Considerations" presented by Walter P. Siegmund at the 6th Annual Meeting of the Avionics Panel, AGARO (NATO) in Paris, France in July 1962. Reference may also be had to Appendix N, entitled "Fiber Optics" and authored by N. S. Kapany, of the text. "Concepts of Classical Optics" by Strong, published by W. H. Freeman and Company in 1958. For use in the optical modulator of this invention, the fiber optic plate will be made by standard techniques and will ordinarily be in the form of a right circular cylinder 1.8 cm. or larger in diameter. The individual fibers will be essentially parallel and cut on a bias so that the fiber axis is inclined with respect to the mechanical axis of the cylinder. The ends of the cylinder will be polished or otherwise optically finished so as to readily accept light incident thereon.

When the optical modulator of FIG. 1 is to be employed in a star angle sensor, suitable diameters for the optical fibers which comprise plate 16 has been found to be in the 6 to 50 micron range while the angle of the axial tilt of the fibers (with respect to the axis of the system) should be limited to 30° or less. It should be noted that most optical systems practical for a star angle sensor, such as that shown in FIG. 1 of copending application 135,339, will produce a spot size (focused image) on the order of 50 microns (.002 inch) in diameter. Thus, in traversing the fiber optic modulator, the spot will be conducted along many fibers. As is well known, the light emitted from an optical fiber is radiated in a cone. Nevertheless, even with the image being conducted along many fibers, the error will be slight. Thus, for a fiber of .0004 inch in diameter and an axial tilt of the plate of 30°, an error in the neighborhood of only one second will result. This error is instantaneous and is subject to statistical smoothing both by the rotation of the modulator and by the time and spacial distribution of the arriving photons.

Considering now FIG. 4, an end view of circular reticle 28 is shown. As can be seen, the reticle comprises an opaque disc with four light transparent portions 30. These transparent portions encompass radii from the center of the reticle which are 90° apart. Thus, the time it takes a spot of light which is being scanned about a circle to pass between the transparent portions of reticle 28, when compared with the rotation of plate 16, provides a measure of the location of the center of the circle about which the light spot is rotating and thus provides a measure of the angular relationship of the light source (star) in relation to the axis of the system.

FIGS. 2 and 3 respectively depict the pattern which the spot of light focused at the front of plate 16 will produce at the rear of rotating plate 16 for on-axis and off-axis objects (star). In these figures, ⊗ represents the spot of light emanating from plate 16 while $x$ represents the focal point of the image on the front of plate 16.

Considering now a typical example, the following criteria were imposed upon the system:

$\gamma = 0.5°$ = the maximum off-axis acquisition angle for an object (star)

$D_A = 5$ centimeters = diameter of aperture (object lens)

$F_L=20$ centimeters (7.9 inches) = the focal length of the lens.

The foregoing imposed criteria resulted in:

$\phi=6°$ 27 minutes = required minimum acceptance angle of the fibers comprising the modulator plate. (Stock fiber optics have acceptance angles on the order of 60–80 degrees or larger.)

$\alpha=23°$ = angle of axial tilt of the fibers comprising the optical modulator.

$\beta=11°$ 28' = acceptance angle of sensor (angle between the axis of a sensor positioned behind the reticle and the axis of the cone of light emanating from the modulator).

Maximum cone angle = 42°

$r_s=0.5$ centimeter = maximum radius of circle transcribed on the rear of the optical modulator by a spot of light focused at the front thereof.

$t=1.165$ centimeters = thickness of the fiber optic modulator.

As will be readily seen from the above listed values and the foregoing description, an optical modulator has been invented which is readily adapted to employment in a star angle sensor. This modulator is more compact than prior art devices since the reticle does not have to be located in the focal plane of the objective lens and thus the focal length of the lens is not dictated by physical restrictions imposed by recticle manufacturing techniques. The modulator of this invention is also lighter in weight, may be operated within a gas filled enclosure and, because of its ability to employ air bearings and an optical modulator which is smaller in diameter than the lens, requires less power for operation.

Referring now to FIG. 5, an embodiment of this invention is disclosed which enables visual observation of the object being viewed while the image thereof is simultaneously being scanned about the face of the recticle. In this embodiment, a beam splitter 32 is positioned between objective lens 10 and modulator 14. Beam splitter 32 is designed to deflect, via a mirror 34, a portion of the light entering the apparatus through lens 10 into a viewing or projecting system indicated generally at 36. System 36 is mounted above the modulator assembly with its optical axis normally parallel to the axis of lens 10. In the interests of simplicity, system 36 has been shown as a simple relay lens system comprising lenses 38 and 40. By looking through an eye piece 42, the object being studied may be visually observed via relay lenses 38 and 40, mirror 34, beam splitter 32 and objective lens 10. As in the embodiment of FIG. 1, those photons not reflected into system 36 by beam splitter 32 will be focused at the modulator 14. The image focused at modulator 14 will be scanned about the face of reticle 28 and thus a series of pulses of light will appear to be emitted by recticle 28. These light pulses will be focused by a field lens 44 on an immersion lens 46 and thence on to a photocell 48. The output of photocell 48 is, accordingly, a series of electrical pulses which may be used to provide information concerning the magnitude of the light emitted by and the angle to the object being observed. As in the embodiment of FIG. 1, the elements of the embodiment of FIG. 5 may be located within a gas filled enclosure having, as its entrance window, objective lens 10. However, in the case of the embodiment of FIG. 5, reticle 28 will not function as an exit window. Rather, light will pass out of the apparatus through eye piece 42, which functions as an exit window, and electrical signals will be transmitted out through the sealed leads connected to photocell 48.

In order to permit the apparatus to be employed in determining the angular position of remotely located reflecting surfaces with respect to the boresight of the detecting system (auto-collimation), a pentaprism comprising mirrors 50 and 52 is positioned in system 36 between the eye piece 42 and the relay lens system. Mirror 50 is apertured to enable continued visual observation if such is desired. A light source 54 is positioned in system 36 such that photons emanating therefrom will be reflected by mirrors 50 and 52 and thus turned 90°. The reflected light will then be transmitted by lenses 40 and 38, mirror 34 and beam splitter 32 and will be focused by lens 10 on a reflecting surface (target). The modulator and associated electronics will, in the manner explained above, provide information as to the axis of the beam of light reflected from the target and thus will provide a measurement of the angular position of the target with respect to the axis of the modulator assembly (lens 10 and plate 16). The incorporation of the projection system therefore enables the apparatus of this invention to be employed for monitoring equipment whose orientation must be kept precisely aligned. An output from photoelectric device 48 indicative of misalignment may, through appropriate servomechanisms, be employed to realign the target reflecting surface. It should be noted that, should the target be located in a gaseous environment, the hermetically sealed housings of the embodiments of FIGS. 1 or 5 will be filled with a gas having an index of refraction as close to that of the environmental gas as is possible.

While perferred embodiments have been shown and described, it is to be understood that various modifications and substitutions may be made without departing from the spirit and scope of this invention. Accordingly, it is to be understood that this invention has been described by way of illustration and not limitation.

What is claimed is:

1. An optical modulator comprising:
  a bundle of substantially parallel light conducting fibers, said fibers forming a plate presenting a substantially flat surface to light impinging thereon, said fibers being uniformly angled with respect to the surface of said plate;
  means for focusing an image at the front surface of said plate; and
  means for rotating said plate whereby an image focused at a point in the plane of the front surface of said plate will transcribe a circle on the back surface thereof.

2. The apparatus of claim 1 wherein the front and back surfaces of said plate are substantially parallel and lay in planes parallel to the focal plane of said image focusing means.

3. The apparatus of claim 2 further comprising:
  a reticle positioned behind said plate and having a plurality of light transmissive portions.

4. The apparatus of claim 3 further comprising:
  a hermetically sealed housing enclosing said plate and rotating means, said focusing means forming an entrance window for light entering said housing and the said light transmitting portions of said reticle forming exit windows for light leaving said housing.

5. The apparatus of claim 4 wherein said housing is filled with a gas.

6. The apparatus of claim 1 further comprising:
  means positioned between said focusing means and said light conducting fiber plate for deflecting at least a portion of the light incident thereon.

7. The apparatus of claim 6 wherein said deflecting means comprises:
  a beam splitter for deflecting at least a portion of the light comprising the image focused by said focusing means; and
  means for visually observing said deflected light whereby the image may be simultaneously modulated and visually observed.

8. The apparatus of claim 7 wherein said observing means comprises:
  means for focusing said deflected light said focusing means having its optical axis parallel to the optical axis of said means for focusing the image at the front surface of said fiber optic plate.

9. The apparatus of claim 6 wherein said deflecting means comprises:
a light source; and
means for directing light emanating from said source through said focusing means whereby light provided by said source will be focused at a remotely located surface.

10. The apparatus of claim 9 further comprising:
means for visually observing the focal point of the light emanating from said source.

11. An optical modulator comprising:
a cylindrical fiber optic plate, the individual fibers thereof exhibiting a uniform axial tilt with respect to the surface of said plate;
means for focusing an image of an object in the plane defined by the front surface of said plate;
means for rotating said plate;
a beam splitter positioned between said plate and said focusing means for deflecting a portion of the light incident thereon;
means for visually observing said deflected light whereby the image may be modulated by rotation of said plate while the object is being visually observed;
a reticle having a plurality of light transmissive portions positioned adjacent to the side of said plate located away from said focusing means; and
means responsive to light passed by said light transmissive reticle portions during rotation of said plate for generating electrical signals commensurate with the angle between the line of sight to the object and the optical axis of said focusing means, said signal generating means being positioned on the side of said reticle located away from said plate and being spacially displaced from the reticle.

12. An auto-collimator comprising:
a cylindrical fiber optic plate, the individual fibers thereof exhibiting a uniform axial tilt with respect to the surface of said plate;
means for focusing an image in the plane defined by the front surface of said plate;
means for rotating said plate;
a beam splitter positioned between said plate and said focusing means;
a light source;
means for directing light emanating from said source onto said beam splitter, said light thus being deflected through said focusing means by said beam splitter and being focused on a remotely located reflecting surface by said focusing means;
a reticle having a plurality of light transmissive portions positioned adjacent the side of said plate located away from said focusing means; and
means responsive to light passed by said light transmissive reticle portions during rotation of said plate for generating electrical signals commensurate with the angle between the optical axis of the focusing means and the beam of light reflected from the remotely located surface.

References Cited

UNITED STATES PATENTS

| | | | |
|---|---|---|---|
| 2,939,362 | 6/1960 | Cole | 178—7.6 X |
| 3,055,260 | 9/1962 | Wehling. | |
| 3,031,919 | 5/1962 | Collyer. | |
| 3,242,795 | 3/1966 | Hughes. | |
| 3,365,580 | 1/1968 | Cannella | 350—96 X |
| 2,870,671 | 1/1959 | Falconi | 250—220 |

RONALD L. WIBERT, Primary Examiner

T. R. MOHR, Assistant Examiner

U.S. Cl. X.R.

250—203